(12) United States Patent
Lynch et al.

(10) Patent No.: US 7,813,048 B2
(45) Date of Patent: Oct. 12, 2010

(54) INDUCTORLESS ELECTROACTIVE LENS DRIVER AND SYSTEM

(75) Inventors: Scott Lynch, Half Moon Bay, CA (US); Jimes Lei, Milpitas, CA (US)

(73) Assignee: Supertex, Inc., Sunnyvale, CA (US)

( * ) Notice: Subject to any disclaimer, the term of this patent is extended or adjusted under 35 U.S.C. 154(b) by 38 days.

(21) Appl. No.: 12/260,026

(22) Filed: Oct. 28, 2008

(65) Prior Publication Data

US 2009/0110384 A1    Apr. 30, 2009

Related U.S. Application Data

(60) Provisional application No. 60/983,911, filed on Oct. 30, 2007.

(51) Int. Cl.
*G02B 1/06* (2006.01)
*G02B 3/12* (2006.01)
*G03B 3/10* (2006.01)

(52) U.S. Cl. ........................ 359/665; 396/133
(58) Field of Classification Search ................. 359/665, 359/666; 396/133
See application file for complete search history.

(56) References Cited

U.S. PATENT DOCUMENTS

2009/0009881 A1*    1/2009    Helwegen et al. ........... 359/666

* cited by examiner

*Primary Examiner*—William C Choi
(74) *Attorney, Agent, or Firm*—Jeffrey D. Moy; Weiss & Moy, P.C.

(57) ABSTRACT

An electroactive lens driver comprises a voltage generator generating a high alternating current voltage signal for application to an electroactive lens in response to a low direct current voltage signal. The voltage generator does not include an inductor or a transformer.

29 Claims, 5 Drawing Sheets

FIG. 4 CAPACITOR PRESENT

FIG. 5 CAPACITOR NOT PRESENT

INDUCTORLESS ELECTROACTIVE LENS DRIVER AND SYSTEM

RELATED APPLICATION

This application claims the benefit of U.S. Provisional Patent Application No. 60/983,911, filed Oct. 30, 2007, which is incorporated herein in its entirety by reference.

TECHNICAL FIELD

This invention relates generally to an inductorless and transformerless system of driving an electroactive lens, and more particularly an inductorless and transformerless system of driving an electroactive lens from a low DC voltage source.

BACKGROUND

In many devices employing a camera, cell phones in particular, the camera is provided as a module, consisting of one or more lens elements and an imaging IC, all enclosed in a housing. Due to the tight space requirements, cell phone cameras are a fixed-focus variety—there is simply not enough room for a conventional, mechanical focusing system. Besides focusing abilities, cell phone cameras will eventually include optical zoom, which is not feasible given conventional optical systems and space requirements. Other applications where a compact camera is desirable include endoscopes, borescopes, personal digital assistants (PDAs), and vehicular collision avoidance cameras.

An electroactive lens is a single optical lens element that changes its focal length in response to an applied voltage. Two varieties of electroactive lenses include the liquid lens and the liquid crystal lens. In contrast, conventional optical systems change focal length by mechanically repositioning two or more fixed focal length lens elements relative to each other. Electroactive lenses are more compact and consume less power. Electrically, electroactive lenses can be modeled as a capacitor.

Electroactive lenses offer the promise of providing focusing, and eventually zooming, in a compact module. To minimize space and to provide drop-in design, it is also a goal to incorporate the lens driver inside the camera module. Complicating the situation is the fact that space inside a camera module is minimal, comprising of space around the periphery of the imaging IC.

SUMMARY

In one aspect, an integrated circuit drives an electroactive lens without using any external inductors or transformers.

In another aspect, an integrated circuit drives an electroactive lens without any external components with the exception of an optional bypass capacitor at the output of a charge pump.

In another aspect, an integrated circuit drives an electroactive lens without any external components with the exception of an optional bypass capacitor for the input voltage and an external control signal to set the lens drive frequency.

In another aspect, an electroactive lens system includes a capacitive charge pump circuit to drive an electroactive lens.

In another aspect, an electroactive lens system includes a capacitive charge pump circuit to generate a high voltage DC supply from a low voltage source, which is then supplied to a DC-AC converter to drive an electroactive lens.

DETAILED DESCRIPTION

Figure 1:
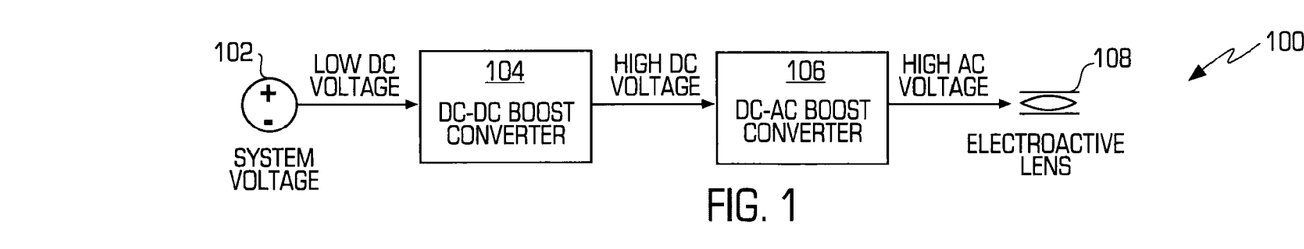
FIG. 1 is a schematic diagram illustrating an electroactive lens system.

FIG. 1 is a schematic diagram illustrating an electroactive lens system 100. The electroactive lens system 100 comprises a system voltage source 102, a DC-DC boost converter 104, a DC-AC converter 106, and an electroactive lens 108. The system voltage source 102 is a low voltage source, such as a low direct current (DC) voltage source. The DC-DC boost converter 104 and the DC-AC converter 106 form a driver for the electroactive lens 108. The DC-AC converter 106 provides a drive voltage, such as a high AC voltage, for driving the electroactive lens 108. The drive voltages may be higher than what is available from a host system (which may include the system voltage source 102), and thus some method of converting a low DC voltage to a high AC voltage is used. The low DC voltage is commonly converted to a high AC voltage in two stages. The DC-DC boost converter 104 provides a first stage to boost the low DC voltage to a high DC voltage. The DC-AC converter 106 provides a second stage to convert the high DC voltage to a high AC voltage. In one embodiment, the DC-AC converter 106 includes an H-bridge.

Figure 2:
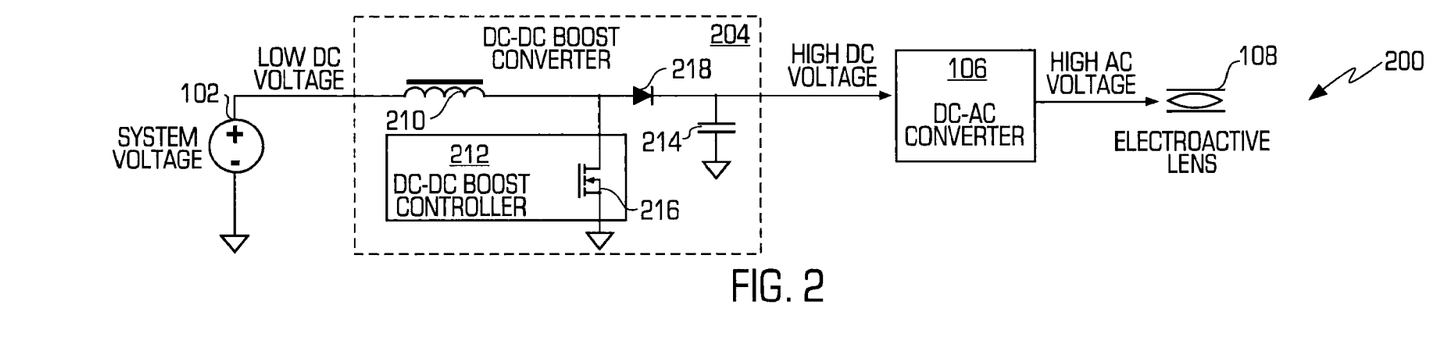
FIG. 2 is a schematic diagram illustrating an electroactive lens system including a DC-DC boost converter that includes an inductor.

FIG. 2 is a schematic diagram illustrating a conventional inductor based electroactive lens system 200. The electroactive lens system 200 includes a system voltage source 102, a DC-DC boost converter 204, a DC-AC converter 106, and an electroactive lens 108. The DC-DC boost converter 204 includes an inductor 210, a DC-DC boost controller 212, a capacitor 214, a switching element 216, and a rectifier 218.

The inductor based electroactive lens system 200 uses four separate devices: the boost controller 212, the inductor 210, the rectifier 218, and the capacitor 214. Due to the number and bulk of these components, especially the inductor 210, an inductor-based approach has size limitations for use within a small camera module or other space-constrained applications.

Figure 3:
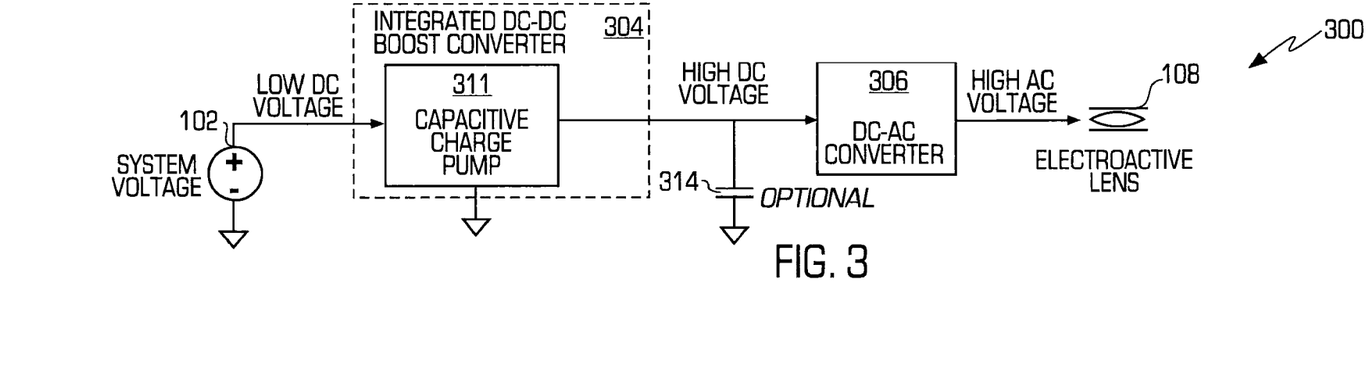
FIG. 3 is a schematic diagram illustrating an electroactive lens system including an inductorless DC-DC boost converter.

FIG. 3 a schematic diagram illustrating an inductorless electroactive lens system 300. The inductorless electroactive lens system 300 includes a system voltage source 102, a direct-current-direct current (DC-DC) boost converter 304, a direct current-alternating current (DC-AC) converter 306, and an electroactive lens 108. The DC-DC boost converter 304 and the DC-AC converter 306 form a voltage generator for driving the electroactive lens 108. In one embodiment, the electroactive lens system 300 includes a capacitor 314. The DC-AC converter 306 provides a drive voltage, such as a high AC voltage, for driving the electroactive lens 108. The DC-DC boost converter 304 boosts the low DC voltage to a high DC voltage. The DC-AC converter 304 converts the high DC voltage to a high AC voltage. In one embodiment, the DC-AC converter 106 includes an H-bridge.

The inductorless electroactive lens system 300 lacks an inductor-based DC-DC converter, and instead uses a capacitive charge pump 311 that may be integrated on-chip. This approach uses only one or two elements: the charge pump 311 and the optional capacitor 314. The capacitive charge pump 311 has an input impedance that has zero or substantially zero inductance. In one embodiment, the charge pump 311 is formed of a plurality of charge pumps cascaded in series.

Figure 4:
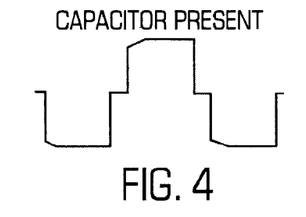
FIG. 4 is a graph illustrating an output voltage waveform of the electroactive lens driver of FIG. 3 that includes a capacitor.
Figure 5:
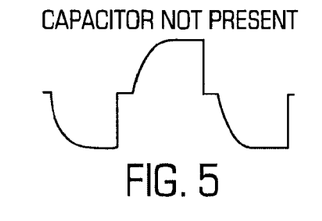
FIG. 5 is a graph illustrating an output voltage waveform of the electroactive lens driver of FIG. 3 that does not include a capacitor.

In one embodiment, the inductorless electroactive lens system 300 does not include a capacitor 314 on the high DC voltage node of the charge pump 311. The charge pump 311 delivers its cycle-by-cycle energy to the capacitive electroactive lens 108 via the DC-AC converter 306. The capacitor 314 stores charge and provides the charge during rising edges to the DC-AC converter 306. The effect of the capacitor on the lens drive waveform is shown in FIG. 4, which is a graph illustrating a voltage waveform of the output of the DC-AC converter 306 in a system that includes a capacitor 314. If the electroactive lens 108 can operate with the waveform of FIG. 5, which is a graph illustrating a voltage waveform of the output of the DC-DC converter 304 in a system that does not include a capacitor 314, the capacitor 314 may be eliminated.

Figure 6:
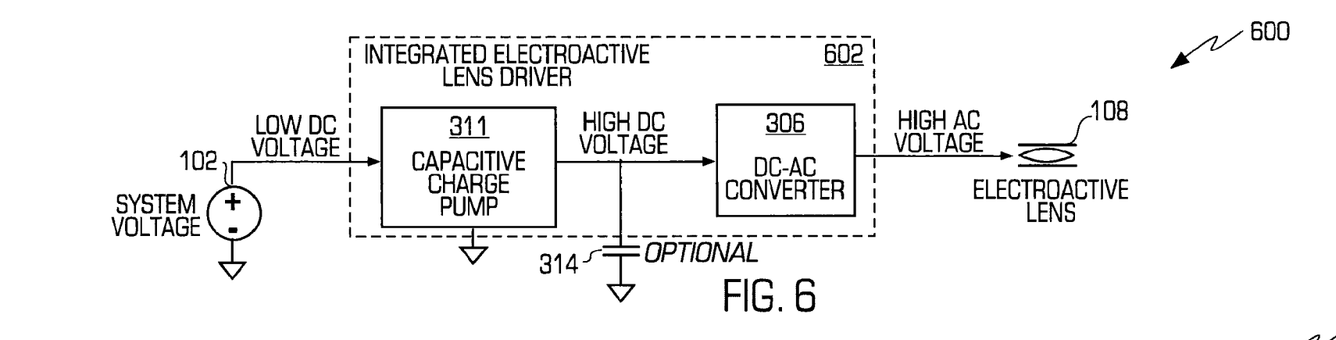
FIG. 6 is a schematic diagram illustrating an integrated electroactive lens system including an integrated electroactive lens driver that includes an inductorless DC-DC boost converter.

FIG. 6 is a schematic diagram illustrating an integrated electroactive lens system 600 that includes an integrated electroactive lens driver 602. The charge pump DC-DC converter 602 includes a charge pump 311 that is integrated on an integrated circuit (IC) with the DC-AC converter 306. In one embodiment, the electroactive lens driver is a single IC and the optional capacitor 314. The integrated electroactive lens system 600 provides a more compact system, which can be made compact enough to fit inside a camera module.

Figure 7:
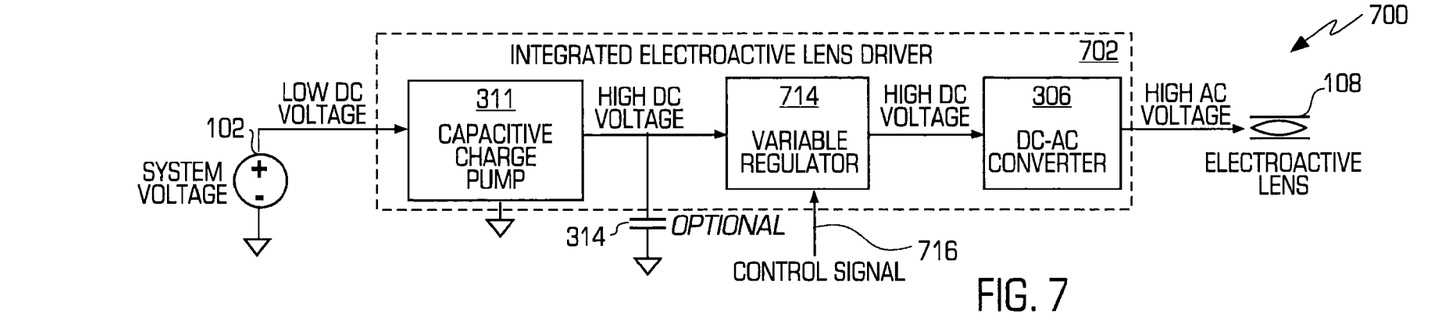
FIG. 7 is a schematic diagram illustrating an integrated electroactive lens system including an integrated electroactive lens driver that includes an inductorless DC-DC boost converter and a variable regulator.

FIG. 7 is a schematic diagram illustrating an integrated electroactive lens system 700. An integrated electroactive lens driver 702 includes an inductorless DC-DC boost converter 311, a variable regulator 714, and a DC-AC converter 306. The charge pump 311 provides an intermediate high DC voltage that is regulated by the variable regulator 714 to provide a regulated high DC voltage to the DC-AC converter 306. A control signal 716 provides a control signal or reference voltage to the variable regulator 714.

Many electroactive lenses 108 use a variable amplitude drive waveform. This can be accomplished by inserting the variable regulator 714 between the charge pump 311 and the DC-AC converter 306. This variable regulator 714 may be integrated on the same die as the charge pump 311 and the DC-AC converter 306. In one embodiment, the variable regulator 714 is a digital to analog converter, and is coupled to a serial digital interface (not shown), which is coupled to an external control circuit for controlling the variable regulator 714.

Figure 8:
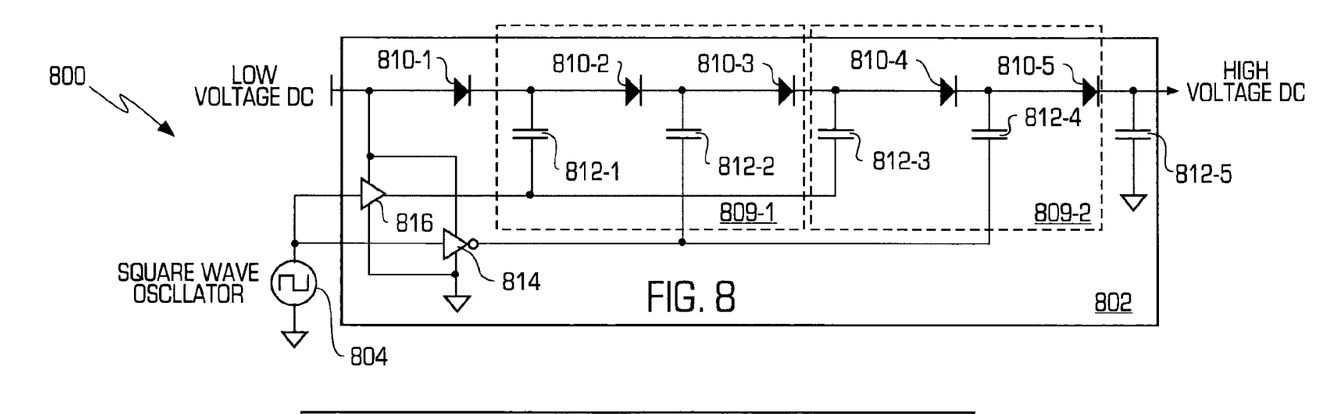
FIG. 8 is a schematic diagram illustrating one embodiment of a charge pump boost converter of the inductorless DC-DC boost converter of FIGS. 3, 6, and 7.

FIG. 8 is a schematic diagram illustrating a charge pump 800, which is one embodiment of the charge pump 311. The charge pump 800 comprises a boost circuit 802 and a square wave oscillator 804. In this embodiment, the charge pump DC-DC converter 304 comprises a plurality of diodes 810-1 through 810-5, a plurality of capacitors 812-1 through 812-5 that are arranged in multiple stages to convert the lower input voltage to a higher output voltage. In this embodiment, the charge pump 800 lacks external inductors or transformers. By using small capacitor values for the capacitors 812, the charge pump DC-DC converter 304 may be integrated on a single silicon die. A fully integrated lens driver may include both the DC-DC converter 304 and the DC-AC converter 306. The boost circuit 802 further comprises an inverter 814 and a buffer 816 for controlling the stages of the boost circuit 802 in response to the square wave oscillator 804. The square wave oscillator 804 produces a switching signal within the charge pump circuit 800. The switching signal is split into a first phase by the buffer 816 and a second phase by the inverter 814.

Although five diodes 810 and five capacitors 812 are shown in the boost circuit 802, other numbers of diodes 810 and capacitors 812 may be used. The number of stages may be determined by the minimum low voltage DC input and the desired high voltage DC output—the more stages, the higher the output voltage for a given input voltage. The charge pump 800 runs open-loop, producing a fixed output voltage relative to the input voltage. In another embodiment, an intermediate regulator may be coupled between the DC-DC converter and DC-AC converter.

A stacked capacitor-diode chain is used to generate the high voltage output from the charge pump circuit 800. The capacitors 812 and diodes 810 form a plurality of charge pumps 809-1 and 809-2 within charge pump circuit 800. For example, the charge pump 809-1 comprises the diodes 810-2 and 810-3 and the capacitors 812-2 and 812-3, and the charge pump 809-2 comprises the diodes 810-4 and 810-5 and the capacitors 812-4 and 812-5. Although two charge pumps 809 are shown, the number of charge pumps 809 that are stacked may be determined by the input voltage, the desired output voltage and the losses due to the diode drops of the diodes 810 and the internal series resistance of the capacitors 812.

The charge pump circuit 800 functions as follows: during the first oscillator phase transition, the bottom terminals (the terminals coupled to the output of the buffer 816) of the capacitors 812-1 and 812-3 are initially at a logic low voltage level and transition to a logic high voltage level. At the transition, the capacitor 812-3 charges the capacitor 812-4 through the diode 810-4, and the capacitor 812-3 discharges to within a voltage drop of the voltage at the anode of diode 810-4. In a similar manner, the next stage of the charge pump 802, which comprises the diodes 810-4 and 810-5 and the capacitors 812-3 and 812-4, charges the capacitor 812-4. When the output of square wave oscillator 804 transitions to a logic low voltage level, the capacitor 812-5 charges through the diode 810-5. As the switching action generated by square wave oscillator 804 continues, the capacitor 812-5 charges to a multiple of the input power supply voltage less a number of diode voltage drops. The voltage is determined by the numbed of stacked charge pump stages 809. In FIG. 8, the stacked stages are illustrated by first and second stages formed by the charge pumps 809-1 and 809-2, respectively. Any number of charge pump stages may be inserted between the two stages shown. The input of the last stage is connected to a direct current source via the diode 810-1.

The resulting voltage across the capacitor 812-5 after many switching cycles will be the input power supply voltage multiplied by the number of charge pump stages, less a number of voltage drops equal to two plus the number of charge pump stages (the total number of diodes 810 in the stacked charge pump ladder). As an illustrative example, for an 80V supply generated from a 3V input, and assuming a 0.5V diode drop, at least 32 charge pump stages are used in the stack. As the number of stages is increased, the drive capabilities of the buffer 816 and the inverter 814 is correspondingly increased and the voltage ratings of the capacitors in the charge pumps is increased to handle the higher voltages present in the stack.

Figure 9:
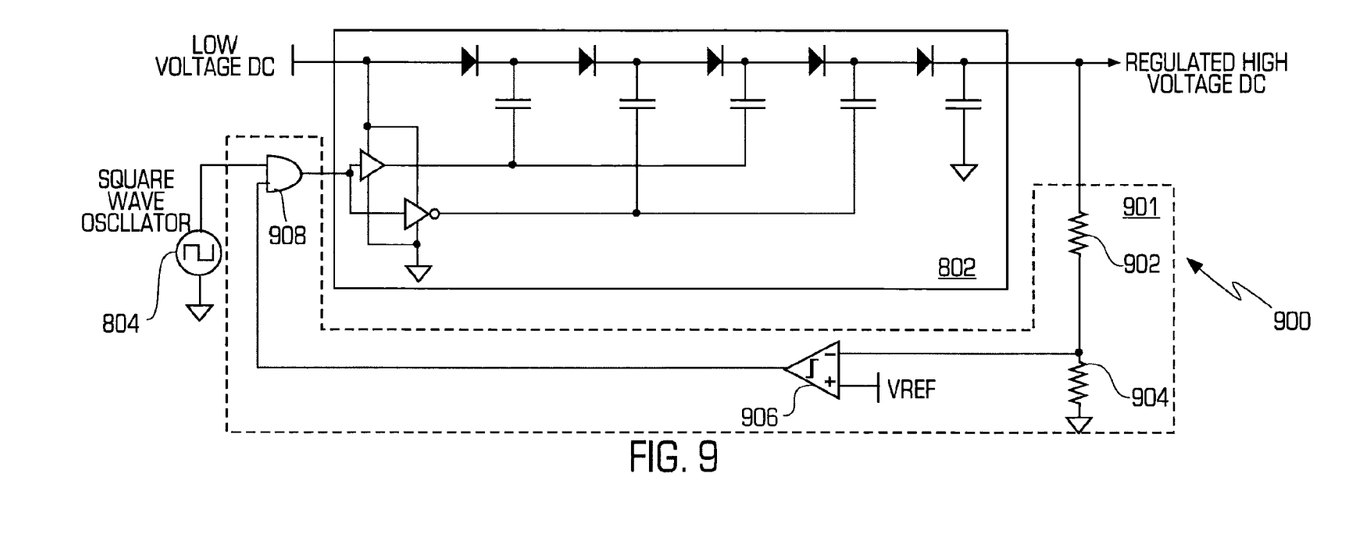
FIG. 9 is a schematic diagram illustrating another embodiment of a charge pump boost converter of the inductorless DC-DC boost converter of FIGS. 3, 6, and 7.

FIG. 9 is a schematic diagram illustrating a charge pump 900, which is another embodiment of the charge pump 311. The charge pump comprises the charge pump 800 and a feedback loop circuit 901 formed by a plurality of resistors 902 and 904, a comparator 906, and an AND gate 908. The feedback loop circuit regulates the output voltage to a desired value. In one embodiment, the feedback loop circuit disables the charge pump circuit 311 when a predetermined voltage level (e.g., a reference voltage Vref) is generated. The signal from the square wave oscillator 804 is gated by a signal from the feedback circuit 901. When the charge pump output voltage is below the regulation threshold as determined by the reference voltage (VREF) and the feedback divider formed by the resistors 902 and 904, the voltage comparator 906 outputs a logic high signal. This logic high signal is applied to the AND gate 908, enabling the square wave oscillator signal to pass thru the AND gate 908 and to the charge pump circuit 802. When the output voltage is above the regulation threshold, the voltage comparator 906 outputs a logic low signal. This logic low signal is applied to the AND gate 908, preventing the square wave oscillator signal from being applied to the charge pump circuit 802. With no signal driving the charge pump circuit 802, no current is delivered to the output. In one embodiment, the comparator 906 has hysteresis.

Figure 10:
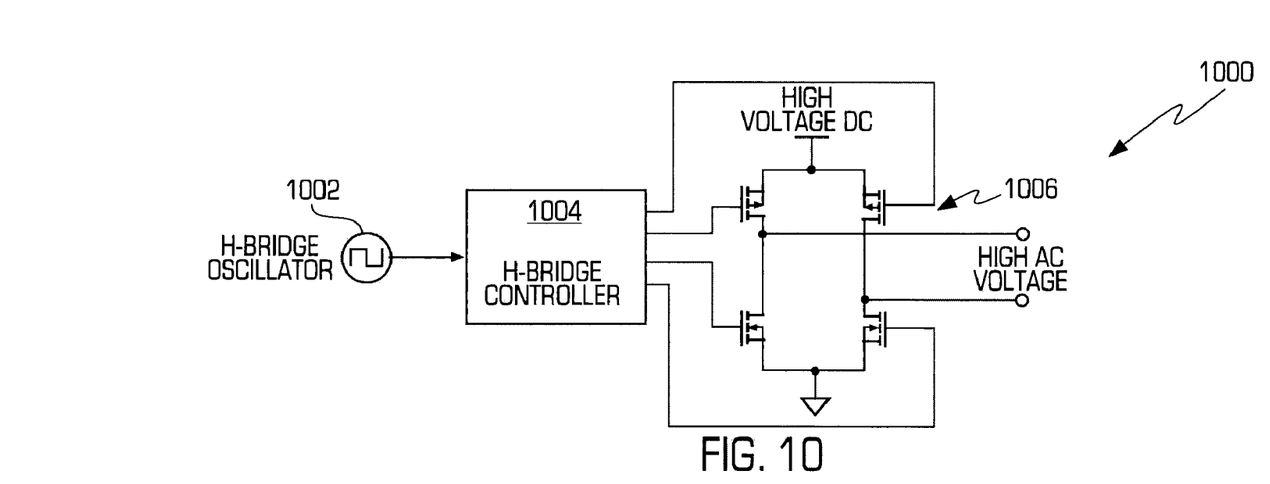
FIG. 10 is a schematic diagram illustrating one embodiment of the DC-AC converter of FIGS. 3, 6 and 7.

FIG. 10 is a schematic diagram illustrating a DC-AC converter 1000, which is one embodiment of the DC-AC converter 306. The DC-AC converter 1000 comprises an H-bridge oscillator 1002, an H-bridge controller 1003 and an H-bridge output stage 1006 that may be supplied from a high voltage DC source. The H-bridge oscillator 1002 may be internal to the driver or externally supplied to the driver. In one embodiment, the H-bridge output stage 1006 is a full bridge transistor circuit for switching DC output alternatively with ground to a pair of output terminals of the DC-AC converter 1000.

Figure 11:
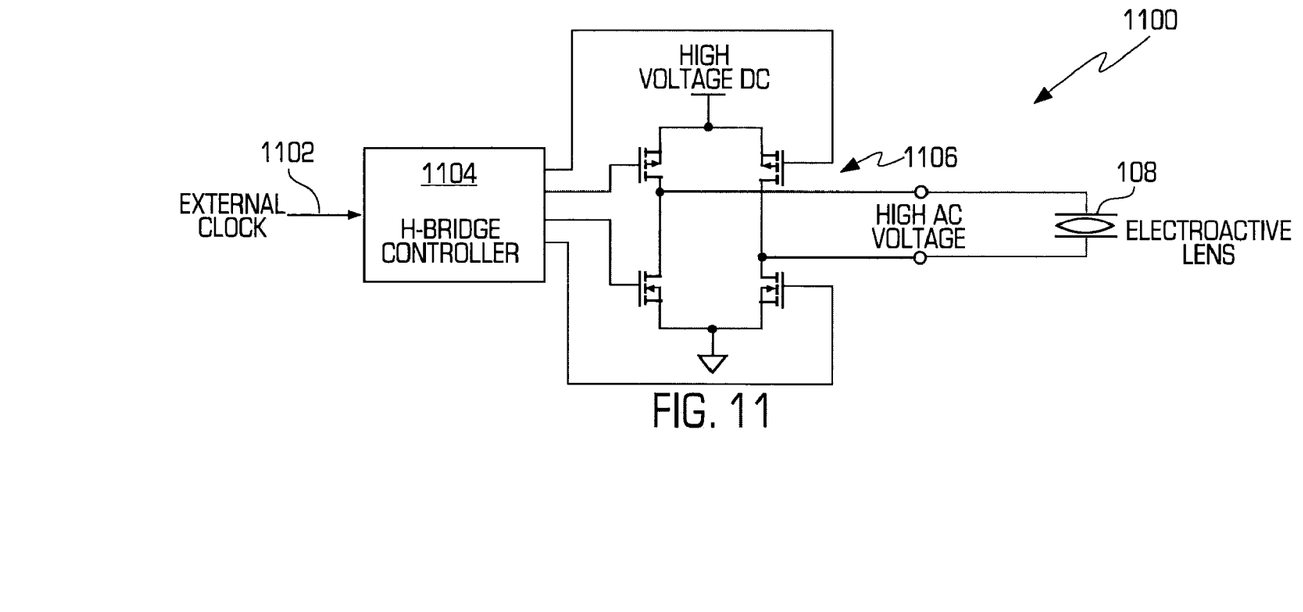
FIG. 11 is a schematic diagram illustrating another embodiment of the DC-AC converter of FIGS. 3, 6 and 7.

FIG. 11 is a schematic diagram illustrating a DC-AC converter 1100, which is another embodiment of the DC-AC converter 306. The DC-AC converter 1100 comprises an H-bridge controller 1104 and an H-bridge output stage 1106 that may be supplied from a high voltage DC source. In this embodiment, an external clock 1102 is provided to the H-bridge controller 1104 to set the lens drive frequency for the electroactive lens 108. The external clock 1102 may be fixed or variable. In one embodiment, the H-bridge output stage 1106 is a full bridge transistor circuit for switching DC output alternatively with ground to a pair of output terminals of the DC-AC converter 1100.

Figure 12:
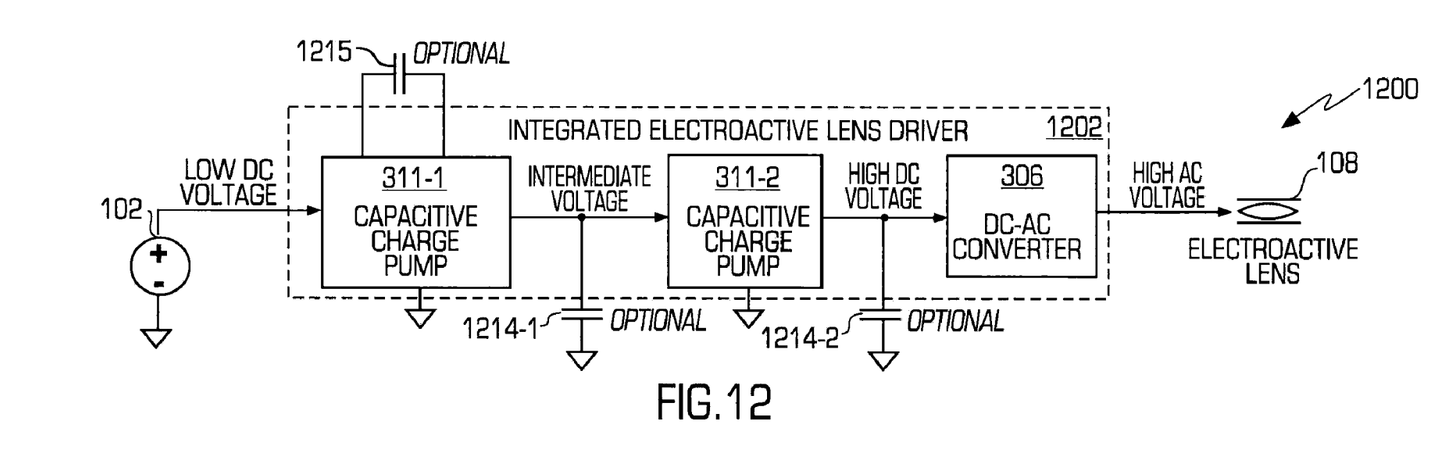
FIG. 12 is a schematic diagram illustrating an integrated electroactive lens system including an integrated electroactive lens driver that includes series coupled capacitive charge pumps.

FIG. 12 is a schematic diagram illustrating an integrated electroactive lens system 1200. The integrated electroactive lens system 1200 comprises an integrated electroactive lens driver 1202 that includes series coupled capacitive charge pumps 311-1 and 311-2 and a DC-AC converter 306. The charge pump 311-1 provides an intermediate high DC voltage. The charge pump 311-2 provides a high DC voltage to the DC-AC converter 306. The first charge pump 311-1 may be constructed slightly differently from the second charge pump 311-2. The first charge pump 311-1 is designed to operate more efficiently from a lower voltage source than the second charge pump 311-2. One embodiment of the charge pump 311-1 is shown in FIG. 13.

Figure 13:
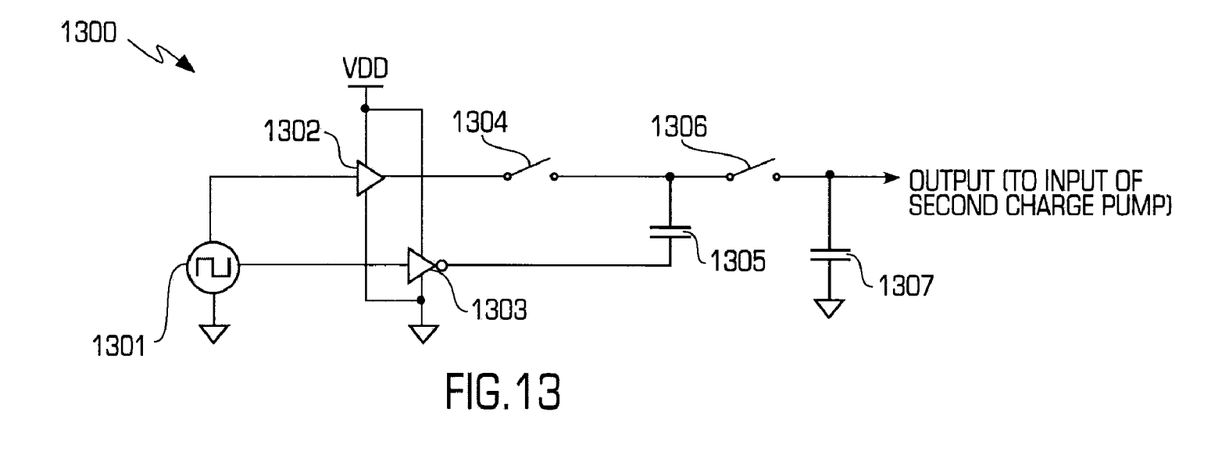
FIG. 13 is a schematic diagram illustrating one embodiment of a capacitive charge pump of the integrated electroactive lens driver of FIG. 12.

FIG. 13 is a schematic diagram illustrating a charge pump 1300, which may be one embodiment of the capacitive charge pump 311-1 of the integrated electroactive lens driver 1202. In one embodiment, analog switches are substituted for the diodes as shown in FIG. 13. The charge pump 1300 comprises a square wave oscillator 1301, a buffer 1302, an inverter 1303, a plurality of switches 1304 and 1306, and a plurality of capacitors 1305 and 1307.

The operation of the circuit 1300 is as follows. Initially the output of the square wave generator 1301 is at a voltage VDD and the switch 1304 is closed, and the switch 1306 is open. The top terminal of the capacitor 1305 then has the voltage VDD applied to it. Simultaneously, the bottom terminal of the capacitor 1305 has zero volts applied to it. Thus the voltage across the capacitor 1305 is VDD. In the subsequent phase of operation, the square wave generator 1301 goes to zero volts, the switch 1304 is open, and the switch 1306 is closed. The bottom terminal of the capacitor 1305 is now at VDD. Adding the voltage VDD across the capacitor 1305, the open circuit voltage at the top terminal would be 2×VDD. If the voltage across the output capacitor 1307 is less than 2×VDD, charge is transferred from the capacitor 1305 to the capacitor 1307, raising the voltage of the capacitor 1307. Charge transfer occurs every cycle of the square wave oscillator 1301 until the output voltage reaches 2×VDD.

Using analog switches in place of the diodes results in greater efficiency and boost ratio because the diode drops have been eliminated. In one embodiment, analog switches are not used throughout the charge pump boost converter (such as in the charge pump 311-2 of FIG. 12) to avoid implementing circuitry to drive the analog switches, which may become more difficult to implement at higher voltages.

In one embodiment, the integrated electroactive lens drivers 602 and 702 have four external terminals. First and second external terminals are coupled to respective first and second terminals of the electroactive lens 108. (For simplicity, only an output arrow is shown in FIGS. 6 and 7 for the coupling to the electroactive lens 108. For an example of the first and second terminals, reference is made to FIGS. 10 and 11). Third and fourth external terminals are coupled to an input power supply and an input power supply return of the system voltage supply 102, respectively. In another embodiment, the integrated electroactive lens drivers 602 and 702 have exactly four external terminals.

There are many advantages for a fully integrated solution. One is ease of design. For the existing solutions that use inductors, design engineers have quite often used the incorrect inductor values thereby either saturating the inductor or not transferring enough energy through the inductor to achieve the desired voltage across the lens. A second advantage is fast design cycle. There is no need for the design engineer to find proper vendors for the external components. A third advantage, as mentioned earlier, is size. Even with small surface mount inductors, they are still physically large. This is especially a concern were space is a premium in such devices as cell phones and PDAs. Applications that are extremely sensitive to height can use flip-chip implementations of the integrated lens driver. The added height by using such a device to the overall circuit would only be the thickness of the die.

In the foregoing description, various methods and apparatus, and specific embodiments are described. However, it should be obvious to one conversant in the art, various alternatives, modifications, and changes may be possible without departing from the spirit and the scope of the invention which is defined by the metes and bounds of the appended claims.

What is claimed is:

1. A circuit for supplying a drive voltage to an electroactive lens, comprising:
    an input terminal for coupling to a low voltage direct current supply;
    an output terminal for coupling to said electroactive lens;
    a high voltage power supply for producing a DC output, said high voltage power supply including a plurality of charge pump circuits coupled between said input terminal and said output terminal; and
    a switching circuit coupled to said output terminal for alternating polarity of said DC output at said output terminal;
    wherein each charge pump of the plurality of charge pump circuits comprises:
    a first diode having a first terminal coupled to a first output of said charge pump circuit for preventing discharge of said first output;
    a first capacitor having a first terminal coupled to a first phase of a clock and further having a second terminal coupled to a second terminal of said first diode for charging said output through said first diode;
    a second diode having a first input coupled to said second terminal of said first diode; and
    a second capacitor having a first terminal coupled to a second phase of a clock input and further having a second terminal coupled to a second output of second diode.

2. The circuit of claim 1, further comprising an oscillator coupled to said high voltage power supply for controlling switching of said plurality of charge pump circuits.

3. The circuit of claim 2, wherein said circuit includes four external terminals comprising:
    a first terminal for coupling to a first terminal of said electroactive lens;
    a second terminal for coupling to a second terminal of said electroactive lens;
    a third terminal for coupling to an input power supply; and
    a fourth terminal for coupling to an input power supply return.

4. The circuit of claim 1, wherein the plurality of charge pumps is cascaded in series.

5. The circuit of claim 4, wherein a first charge pump of said plurality of charge pumps generates a first voltage that is approximately twice an input voltage of said circuit, and wherein a second charge pump of said plurality of charge pumps comprises a plurality of stacked switched capacitor circuits for producing said DC output from said first voltage.

6. The circuit of claim 5, wherein said first charge pump circuit comprises a switched transistor voltage doubler.

7. The circuit of claim 1, further comprising a feedback circuit coupled to plurality of charge pump circuits that disables the plurality of charge pump circuits when a predetermined voltage level is generated.

8. The circuit of claim 1, wherein said circuit has exactly four external terminals comprising:
    a first terminal for coupling to a first terminal of said electroactive lens;
    a second terminal for coupling to a second terminal of said electroactive lens;
    a third terminal for coupling to an input power supply; and
    a fourth terminal for coupling to an input power supply return.

9. The circuit of claim 1, wherein said switching circuit comprises a full bridge transistor circuit for switching said DC output alternatively with ground to said output terminal.

10. The circuit of claim 1, further comprising a variable regulator interposed between said high voltage supply and said switching circuit, whose input is coupled to the DC output of said high voltage DC supply, and the regulator output is coupled to the input of said switching circuit, for providing a variable amplitude AC signal at said output terminals.

11. The circuit of claim 10 where the electroactive lens is a liquid lens.

12. The circuit of claim 10 where the electroactive lens is a liquid crystal lens.

13. The circuit of claim 10 where the variable regulator is a digital to analog converter.

14. The circuit of claim 13 where the electroactive lens is a liquid lens.

15. The circuit of claim 13 where the electroactive lens is a liquid crystal lens.

16. The circuit of claim 10 where the variable regulator is a digital to analog converter coupled to a serial digital interface.

17. The circuit of claim 16 where the electroactive lens is a liquid lens.

18. The circuit of claim 16 where the electroactive lens is a liquid crystal lens.

19. A method for driving an electroactive lens, said method comprising:
    providing a circuit for supplying a drive voltage to said electroactive lens, comprising:
    coupling an input terminal to a low voltage direct current supply;
    coupling an output terminal to said electroactive lens;
    producing a DC output using a high voltage power supply including a plurality of charge pump circuits coupled between said input terminal and said output terminal; and
    alternating polarity of said DC output at said output terminal using a switching circuit;
    wherein each charge pump of the plurality of charge pump circuits comprises:
    a first diode having a first terminal coupled to a first output of said charge pump circuit for preventing discharge of said first output;
    a first capacitor having a first terminal coupled to a first phase of a clock and further having a second terminal coupled to a second terminal of said first diode for charging said output through said first diode;
    a second diode having a first input coupled to said second terminal of said first diode; and
    a second capacitor having a first terminal coupled to a second phase of a clock input and further having a second terminal coupled to a second output of second diode.

20. The method of claim 19, further comprising doubling an input supply voltage to produce said supply voltage for said charging.

21. The method of claim 19, further comprising coupling a variable regulator said high voltage supply and said switching circuit, coupling an input of the variable regulator to the DC output of said high voltage DC supply, and coupling an output of the variable regulator to the input of said switching circuit, for providing a variable amplitude AC signal at said output terminals.

22. The method of claim 21 where the electroactive lens is a liquid lens.

23. The method of claim 21 where the electroactive lens is a liquid crystal lens.

24. The method of claim 21 wherein the variable regulator is a digital to analog converter.

25. The method of claim 24 wherein the electroactive lens is a liquid lens.

26. The method of claim 24 wherein the electroactive lens is a liquid crystal lens.

27. The method of claim 21 wherein the variable regulator is a digital to analog converter coupled to a serial digital interface.

28. The method of claim 27 wherein the electroactive lens is a liquid lens.

29. The method of claim 27 wherein the electroactive lens is a liquid crystal lens.

* * * * *